United States Patent
Hayden

(10) Patent No.: US 8,595,262 B1
(45) Date of Patent: Nov. 26, 2013

(54) RESOURCE RESOLUTION IN COMPUTING ENVIRONMENTS USING DIRECTED GRAPHS

(75) Inventor: Andrew Hayden, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 13/434,104

(22) Filed: Mar. 29, 2012

(51) Int. Cl.
G06F 17/30 (2006.01)

(52) U.S. Cl.
USPC ............ 707/798; 719/314; 370/252; 370/254

(58) Field of Classification Search
USPC .................. 707/768, 798, E17.011, 999.005; 709/224, 225; 370/252, 254; 719/314
See application file for complete search history.

(56) References Cited

U.S. PATENT DOCUMENTS

| | | | |
|---|---|---|---|
| 7,590,715 B1* | 9/2009 | Raanan | 709/223 |
| 7,710,884 B2* | 5/2010 | Liu et al. | 370/238 |
| 7,805,473 B2 | 9/2010 | Ward | |
| 7,836,056 B2 | 11/2010 | Meijer et al. | |
| 8,244,853 B1* | 8/2012 | Raanan | 709/224 |
| 2001/0047422 A1* | 11/2001 | McTernan et al. | 709/231 |
| 2002/0133784 A1* | 9/2002 | Gupta et al. | 716/1 |
| 2003/0153994 A1* | 8/2003 | Jin et al. | 700/99 |
| 2004/0193388 A1* | 9/2004 | Outhred et al. | 703/1 |
| 2005/0111375 A1* | 5/2005 | Ravindran et al. | 370/252 |
| 2005/0192955 A1* | 9/2005 | Farrell | 707/5 |
| 2005/0251805 A1* | 11/2005 | Bamba et al. | 718/100 |
| 2006/0080285 A1* | 4/2006 | Chowdhuri | 707/3 |
| 2007/0192280 A1* | 8/2007 | Agrawal et al. | 707/2 |
| 2007/0214131 A1* | 9/2007 | Cucerzan et al. | 707/5 |
| 2007/0294289 A1* | 12/2007 | Farrell | 707/103 R |
| 2008/0080396 A1 | 4/2008 | Meijer et al. | |
| 2008/0082490 A1 | 4/2008 | MacLaurin et al. | |
| 2008/0086446 A1* | 4/2008 | Zhang et al. | 707/2 |
| 2008/0184262 A1* | 7/2008 | Ginis et al. | 719/314 |
| 2008/0222094 A1* | 9/2008 | Cox | 707/3 |

(Continued)

OTHER PUBLICATIONS

Jimeng Sun, Yinglian Xie, Hui Zhang, and Christos Faloutsos—"Less is More: Sparse Graph Mining with Compact Matrix Decomposition"—Statistical Analysis and Data Mining—vol. 1, Issue 1, pp. 6-22, Feb. 2008.*

(Continued)

*Primary Examiner* — Jean B Fleurantin
*Assistant Examiner* — Anh Ly
(74) *Attorney, Agent, or Firm* — Robert C. Kowert; Meyertons, Hood, Kivlin, Kowert & Goetzel, P.C.

(57) ABSTRACT

Methods and apparatus for resource resolution in computing environments using directed graphs are disclosed. A system includes a resource resolver and data sources that comprise records on resource classes of a provider network. The resolver receives a request to identify a set of resources of the provider network based on specified criteria. The resolver utilizes a directed graph representation of the data sources to identify query sequences to be directed to the data sources in response to the request. Each node of the graph represents a data source, and each edge represents a logical relationship between the data sources represented by the nodes connected by the edge. Each edge has a weight based on a performance metric obtained from a data source whose node is connected by the edge. The resolver issues queries of a preferred query sequence, identified using edge weights, to respective data sources.

28 Claims, 11 Drawing Sheets

(56) References Cited

U.S. PATENT DOCUMENTS

| | | | |
|---|---|---|---|
| 2008/0307104 A1* | 12/2008 | Amini et al. | 709/231 |
| 2009/0172704 A1 | 7/2009 | Ingle et al. | |
| 2010/0050173 A1 | 2/2010 | Hensbergen | |
| 2010/0054465 A1* | 3/2010 | Asano et al. | 380/46 |
| 2010/0077201 A1* | 3/2010 | Asano et al. | 707/797 |
| 2010/0106779 A1* | 4/2010 | Yamauchi | 709/205 |
| 2010/0257523 A1 | 10/2010 | Frank | |
| 2010/0313145 A1 | 12/2010 | Dillenberger et al. | |
| 2011/0075674 A1 | 3/2011 | Le et al. | |
| 2011/0085472 A1* | 4/2011 | Somasundaram et al. | 370/254 |
| 2011/0202655 A1 | 8/2011 | Sharma et al. | |
| 2011/0252420 A1* | 10/2011 | Tung et al. | 718/1 |
| 2012/0079234 A1* | 3/2012 | Tarta et al. | 712/28 |
| 2012/0079505 A1* | 3/2012 | Tarta et al. | 719/314 |
| 2012/0102186 A1* | 4/2012 | Rewaskar et al. | 709/224 |
| 2012/0317142 A1* | 12/2012 | Broecheler et al. | 707/770 |
| 2013/0007753 A1* | 1/2013 | Jain | 718/103 |
| 2013/0041871 A1* | 2/2013 | Das et al. | 707/662 |

OTHER PUBLICATIONS

Craig Boutilier, Fahiem Bacchus, and Ronen I. Brafman—"UCP-networks: a directed graphical representation of conditional utilities"—Proceeding UAI'01 Proceedings of the Seventeenth conference on Uncertainty in artificial intelligence, 2001, pp. 56-64.*
Wikipedia, "Shortest Path Problem," last modified Mar. 16, 2012, 7 pages.
Amazon Web Services LLC, "Elastic Load Balancing," downloaded Mar. 26, 2012, 3 pages.
Amazon Web Services LLC, "Auto Scaling," downloaded Mar. 26, 2012, 3 pages.
Amazon Web Services LLC, "High Performance Computing (HPC) on AWS," downloaded Mar. 26, 2012, 4 pages.
Amazon Web Services LLC, "Amazon Elastic Block Store (EBS)," downloaded Mar. 26, 2012, 4 pages.
Amazon Web Services LLC, "Amazon EC3 Instance Types," downloaded Mar. 26, 2012, 5 pages.

* cited by examiner

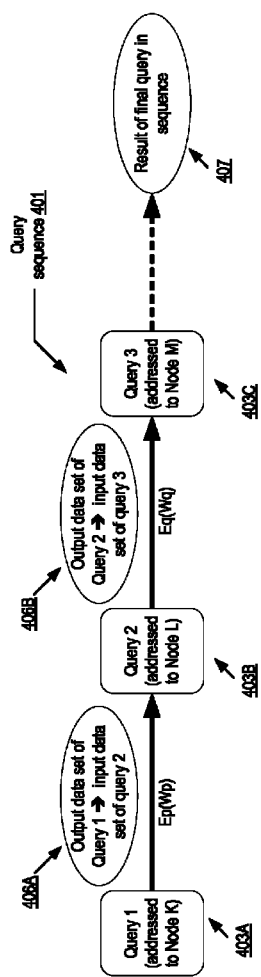

RESOURCE RESOLUTION IN COMPUTING ENVIRONMENTS USING DIRECTED GRAPHS

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers. However, as the scale and scope of typical data centers has increased, the tasks of provisioning, administering, and managing the physical computing resources have become increasingly complicated.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines. Furthermore, some virtualization technologies are capable of providing virtual resources that span two or more physical resources, such as a single virtual machine with multiple virtual processors that spans multiple distinct physical computing systems. As another example, virtualization technologies may allow data storage hardware to be shared among multiple users by providing each user with a virtualized data store which may be distributed across multiple data storage devices, with each such virtualized data store acting as a distinct logical data store that provides users with the illusion that they are the sole operators and administrators of the data storage resource. Virtualization may be implemented at multiple levels—for example, some cloud computing vendors may provide a potentially large collection of networked resources to a given client as a "virtual private cloud", such that to the client, the set of networked resources appears to be an isolated private network in which the client has almost as much administrative control (e.g., with respect to network addressing, routing, and so on) as if the resources all resided within the client's own data center.

In many environments, operators of large provider networks that implement different types of virtualized computing, storage, and/or other network-accessible functionality also support various kinds of enhanced services, e.g., easy to use load balancing mechanisms, clustered resources that can be dedicated to certain classes of applications such as map-reduce or other distributed computing applications, workflow services, specialized software development and deployment systems, and so on. Many of these enhanced services are often implemented somewhat independently of one another, for example by different development groups at different points in time, potentially with different design goals and implementation techniques, which can result in inefficiencies when certain types of operational or administrative questions need to be answered. For example, depending on the different roles that compute instances of the network may play in providing the various types of enhanced services, there may be multiple different information sources that can be used in several combinations to answer a question of the type "Which compute instances in the network have version V1 of software S1 installed?." A simplified, unified approach to such resource identification problems may help enhance operational productivity.

BRIEF DESCRIPTION OF THE DRAWINGS

FIG. 4 illustrates an example of a type of a query sequence that may be generated by a resource resolver, in which the output of a given query serves as input for the next query in the sequence, according to at least one embodiment.

FIG. 5 illustrates an example of a user request that may be expressed using an SQL-like syntax, according to at least one embodiment.

Figure 1:
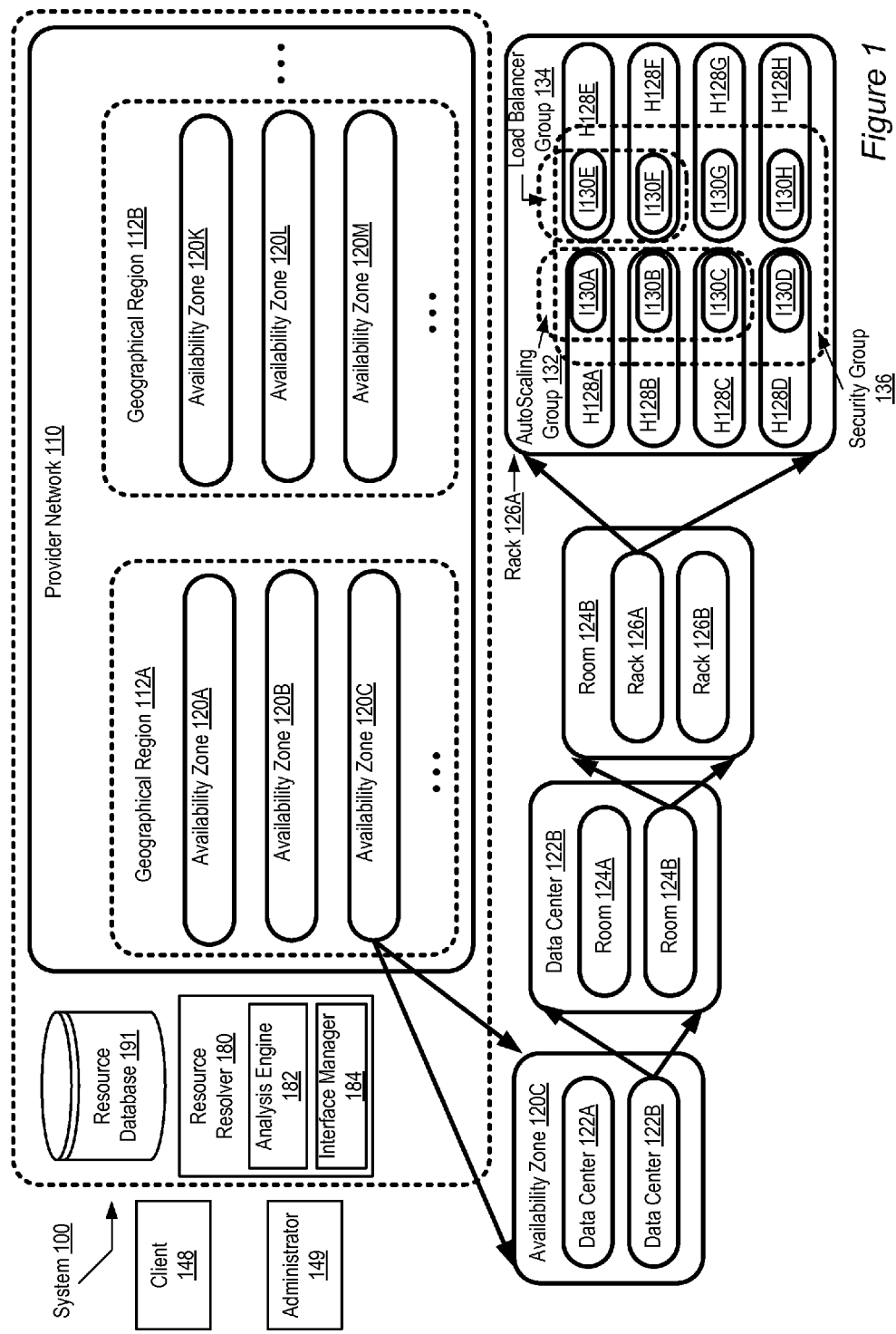
FIG. 1 illustrates an example system environment illustrating one way in which assets of a provider network may be grouped, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims.

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Various embodiments of methods and apparatus for resource resolution in computing environments using directed graphs are described. Networks set up by an entity such as a company or a public sector organization to provide one or more services (such as various types of cloud-based computing or storage) accessible via the Internet and/or other networks to a distributed set of clients may be termed provider networks in this document. Such a provider network may include numerous data centers hosting various resource pools, such as collections of physical and/or virtualized computer servers, storage devices, networking equipment and the like, needed to implement and distribute the infrastructure and services offered by the provider. The resources may in some embodiments be offered to clients in units called "instances," such as virtual or physical compute instances or storage instances. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor).

Operators of such provider networks may in some instances implement a variety of enhanced services involving groups of resources. For example, a vendor may implement techniques for automatically provisioning additional compute instances to an "auto-scaling group" of resource instances when threshold conditions specified by the client are met, e.g., based on measured resource utilization levels of the members of the auto-scaling group. Instances among which a client wishes to distribute a workload may be collected into "load-balanced groups". The vendor may provide clustering support of various kinds—e.g., clusters to support distributed computing such as the map-reduce paradigm of computing, clusters to implement various other types of parallel computing techniques, and so on. In one environment, resources used in a software development process may be grouped into stages, such as development stages, test stages, quality assurance (QA) stages, and production stages. In some cases a given resource such as a compute instance may belong to multiple groups—e.g., an instance that belongs to an auto-scaling group may also belong to a load-balancer group. In general there may be many different ways to categorize the resources or assets of a provider network.

Some types of categories may be hierarchical in nature. In some embodiments, for example, the provider network may be organized into a plurality of geographical regions, and each region may include one or more availability zones. An availability zone in turn may comprise portions or all of one or more distinct locations or data centers, engineered in such a way that the resources in a given availability zone are insulated from failures in other availability zones. That is, a failure in one availability zone may not be expected to result in a failure in any other availability zone; thus, the availability profile of a resource instance is intended to be independent of the availability profile of a resource instance in a different availability zone. Clients may be able to protect their applications from failures at a single location by launching multiple application instances in respective availability zones. A data center in turn may comprise several rooms, each of which may contain several racks, each of which in turn may house several servers, network devices or storage devices.

There may be several data sources from which information about the various groupings of network assets may be obtained. For example, different software services may be responsible for implementing certain types of functionality, such as load balancing, distributed computing clusters, or workflow systems, and such software services may be accessible as repositories of information useful in resolving resource queries. One or more infrastructure data sources may be implemented in some embodiments to store information various types of assets, which could be implemented using relational databases, object oriented databases, lightweight directory access protocol (LDAP), or custom-built software applications. Often information may be stored redundantly across these various data sources—for example, information about a particular instance may be available from an LDAP server used for authentication, in a relational database storing inventory information, as well as from respective services implementing the various types of functionality for which the instance is being used—e.g., a clustering service, an auto-scale service, a load balancer service, and so on. In order to determine, for example, which compute instances happen to be running a particular machine image build "MI-X", it may be possible to start by querying any of several data sources, and depending on the output produced by the initial query, develop and run additional queries for other data sources, until the desired answer is obtained. Identifying such instances may be of interest for a variety of reasons; for example, because the MI-X image may have a bug that could eventually result in operational problems. Especially if there were some expectation of the bug being related to load balancing functionality, one may begin the search for the set of compute instances by finding out a list of load balance groups, and then for each load balance group found, identify the set of compute instances in the group. Then, for each instance found, the build of machine image installed may be identified, and if it matches "MI-X", the instance may be added to a final result set. Alternatively, one could begin by first enumerating the list of regions of the provider network, then find the availability zones in each region, then the data centers in each zone, the rooms and racks in each data center, and so on, until information about machine images being used for all the instances was obtained. Each of these query sequences may have different costs—e.g., in terms of the total time taken, the resources used, the amount of human effort involved, and so on.

In one embodiment, a provider network operator may implement a resource resolver in order to make these types of resource identifications more efficient and effective. The term "resource resolution" may be used synonymously with the term "resource identification" in this document. The resource resolver may implement a data model in which each of the different types of assets or resources of the provider network, as well as the different groupings of resources, may be represented as a respective resource class. So, for example, regions would be represented by a "regions" class, data centers by a "data center" class, load balancer groups by a "load balancer group" class, compute instances by a "compute instance" class, and so on. Corresponding to each class, the resource resolver may identify a data source for information about that class. As noted above, different types of data sources may have been set up for the different entities of the provider network—e.g., LDAP servers, software services, and database systems of various types. The resource resolver may be configured to respond to resource-related user queries or requests from administrators of the provider network, clients of the provider network, and/or other source such as third party providers that may use the services of the provider network to develop and distribute their own add-on services.

Upon receiving a request to identify a (possibly empty) set of resources based on one or more criteria, the resource resolver may in some embodiments be operable to utilize a directed graph representation of some or all of the data sources for the various resource classes of the network. The directed graph may comprise a plurality of nodes and a plurality of edges. Each node may represent a data source, and each edge may represent a logical relationship between the resource classes represented by the nodes connected by the edge. For example, a containment relationship such as "each availability zone belongs to one and only one region" or "each region contains one or more availability zones" may be indicated by the direction of an edge between a "regions" node and an "availability zone" node. Containment relationships indicated by the edge directions may include either parent-child relationships (resource class A may contain one or more entities of resource class B, therefore the edge points from the node for A to the node for B), child-parent relationships (each entity of resource class D belongs to an entity of resource class E, so the edge points from the node for D to the node for E), or both parent-child and child-parent relationships in various implementations. In one embodiment, each edge of the graph may have a numerical weight associated with it, computed at least in part based on a performance metric obtained from one or both of the data sources whose nodes are connected by the edge. For example, average response times of a certain type of query directed to a data source represented by a given node may be used to assign a weight to an edge connecting that node. The edge weights may thus serve as direct or indirect indicators of expected query costs in such embodiments.

Using the directed graph, the resource resolver may identify one or more query sequences that may be used to respond to the request in one embodiment. Each query sequence may include a plurality of queries, each of which may be directed to a respective data source. The particular data sources to be queried may be selected based on one or more factors, such as the logical relationships of the corresponding resource classes and/or the weight of an edge used to reach the node for the data source in the graph. In one embodiment, the output data set or result set of a given query of a query sequence may serve as the input data set for the next query in the sequence, or control the number of iterations required of the next query in the sequence. For example, when enumerating the instances in a particular region R1, one query sequence may consist of the logical equivalent of the following: (Query1) Find all the availability zones in R1. (Query2) For each availability zone found, find each data center. (Query3) For each data center found, find each room . . . etc. In this example, the result set of Query1 is a set of availability zones. For each element of that set, an iteration of Query2 is run; for each element of the result set of Query2, an iteration of Query3 is run, and so on.

The resource resolver may find several feasible query sequences for a given request in some embodiments. That is, it may be possible to arrive at the same final result using several alternative sets of API calls or queries, because for example some of the resources belong to multiple resource classes or resource class hierarchies, and/or because resource records at the various data sources may contain redundant information. In order to decide which query sequence to implement, in such embodiments the resource resolver may assign relative projected performance rankings to each query sequence, derived at least in part on the weights of the edges connecting the nodes representing the data sources to be queried. The query sequence with the best performance ranking may be selected for execution, i.e., the resource resolver may issue the queries of the most preferred query sequence based on the performance ranking Various applicable graph theory algorithms, such as one or more "shortest-path" algorithms, may be used to identify and/or rank the query sequences. Depending on the operational conditions of the network, at any given point in time some of the issued queries may either fail completely (i.e., no result may be obtained because a data source happened to be inactive or shut down) or may have unacceptable performance. Both of these outcomes may be classified as effective failures. In case of such an effective failure, the resource resolver may be configured to attempt the query sequence with the next highest projected performance. If the second query sequence also results in a failure, the third-ranked query sequence may be tried, and so on, until either all query sequences are exhausted or the desired result is obtained. As the resource resolver issue queries and obtains the corresponding result sets (or identifies failures), the resource resolver may update the weights of the corresponding edges in the graph. A special failure-indicating weight, such as a negative number or a symbol representing an infinite weight, may be used for those edges connecting nodes at whose data sources effective failures were encountered in some implementations. The graph may be stored in persistent storage in some embodiments.

In some embodiments, the resource resolver may implement one or more programmatic interfaces, such as an application programming interface (API), a web-based interface, and/or a command-line interface, to allow users to submit their resource resolution requests. In one such embodiment, users may be allowed to express their requests in a syntax based at least in part on the Structured Query Language (SQL). A web-based interface that allows the specification of query predicates or clauses for various resource classes may be implemented in some embodiments. In some implementations, the types of resource-related information accessible may differ for different sets of users—for example, clients of the provider network may not be allowed to obtain details such as exactly which rack in which data center houses a particular instance, while administrators may have access to such details. Such access control policies may be implemented via the interface in some embodiments—e.g., the interface may only allow administrators to submit certain kinds of requests or see certain kinds of results. In one embodiment, the weights assigned to the graph's edges may themselves be dependent on the entity that submitted the initial request. For example, if the users of the resource resolver are divided into two sets A and B with different levels of access to resource information stored at the various data sources, then the results and response times for queries run on behalf of the users of set A may be different from the results and response time for similar queries run on behalf of users of set B. In such a scenario, the resolver may use different weights for the graph edges for requests received from users of set A than the weights used for requests received from users in set B—e.g., an array of weights may be maintained for each edge for a particular type of query, instead of maintaining a single weight.

The data sources themselves may in some implementations be configured to support a specified set of APIs. For example, in one embodiment each data source may be required to implement a "nearest-neighbors API" or a "nearest-neighbors protocol". In accordance with such a protocol, a given data source may be responsible for responding to queries addressing only a subset of resource classes—the resource class whose records are maintained in that data source, and the resource classes of any nodes that are nearest neighbors of the node representing the given data source in the graph. Queries addressing other resource classes (i.e., classes that are not represented by the nearest neighbors of the given data source's node, or by the given data source itself) may be ignored or rejected. By implementing a nearest-neighbors API, the various data sources may each be able to reduce the number of distinct types of queries that they have to support, which may in turn lead to better code quality and fewer errors. In addition, implementing a nearest-neighbors API may reduce the chances of success of malicious attacks that try to overwhelm the resource resolver's service by submitting queries about a large number of resource classes, because the use of such an API would allow data sources to reject those queries that do not apply to them or to their nearest neighbors. In some embodiments a data source implementing a nearest-neighbor API may support queries requesting a list of the resource classes about which the data source is configured to respond.

Example System Environment

FIG. 1 illustrates an example system environment illustrating one way in which assets of a provider network may be grouped, according to at least some embodiments. The system 100 includes a provider network 110 whose resources are distributed across a plurality of geographical regions, such as regions 112A and 112B. Each region in the illustrated embodiment comprises one or more availability zones 120, such as availability zones 120A, 120B and 120C in region 112A, and availability zones 120K, 120L and 120M in region 112B. A given availability zone may itself comprise portions or all of one or more data centers—for example, availability zone 120C includes data centers 122A and 122B. Continuing down the location-based hierarchy, each data center may comprise a plurality of rooms, such as rooms 124A and 124B of data center 122. Within each room, hosts, network devices and/or storage devices may be arranged in racks, such as racks 126A and 126B of room 124B. In the illustrated embodiment, eight hosts are shown in rack 126A-H128A, H128B, H128C, H128D, H128E, H128F, H128G and H128H. Each host is being used for a corresponding compute resource instance—e.g., instance 1130A runs on host H128A, instance 1130B on H128B, and so on.

The instances 130 may be providing a number of different types of enhanced functionality built on top of their core compute capabilities. For example, some instances such as 1130A, 1130B and 1130C are shown as belonging to an auto-scaling group 132. The auto-scaling group 132 may represent a collection of resource instances allocated to a client (such as client 148) that desires automated provisioning (and/or decommissioning) of resources in response to specified threshold conditions being reached. For example, if the workload targeted at the instances forming auto-scaling group increases such that the average CPU utilization of the instances reaches 80% over a specified time period, additional instances may be activated and brought into the group. In another example of enhanced functionality, some instances such as 1130E and 1130F may form a load balancer group 134, such that incoming network traffic to an application implemented using the instances collectively is distributed across the instances using some designated load balancing algorithm. Instances 1130 may also belong to security groups, such as security group 136, which is shown as including all eight instances of rack 126A. Various security settings, such as the Transmission Control Protocol (TCP) ports that are open for incoming or outgoing traffic, may be shared by instances that belong to a given security group. It is noted that although for clarity the auto-scaling group 132, load balancer group 134. and security group 136 are shown as including only instances of rack 126A, in general such groups may include instances that may be resident on other hosts at other racks, rooms, data centers and the like. Furthermore, a given instance 1130 may also belong to multiple logical groupings or resource classes not illustrated in FIG. 1, such as high-performance compute clusters, distributed computing clusters, workflow server groups, and the like. In addition, a given rack 126 may include other types of devices such as storage devices such as disk arrays or storage appliances, network devices such as routers and switches, and so on, that are not shown in FIG. 1.

In the illustrated embodiment, system 100 may include a resource resolver operable to respond to resource resolution or identification requests from users such as clients 148, administrators 149, and/or other entities such as third-party service providers that may be using the provider network to implement services for their own customers or clients. The various types of resources and resource groupings described above may each be represented as a respective resource class by the resource resolver 180. The resource manager 180 may include an interface manager 184 and an analysis engine 182 in some embodiments. The interface manager 184 may be responsible for implementing one or more interfaces (such as an API, one or more web pages, command-line tools, or installable graphical user interface (GUI) clients) allowing users to submit their resource identification requests and receive responses to their requests. The analysis engine 182 may be responsible for performing various types of computations and interactions involved in determining the responses to user requests—e.g., for generating or retrieving an up-to-date directed graph representation of the resource classes of the provider network, identifying feasible query sequences, selecting optimal or preferred query sequences, executing queries of the preferred query sequences by directing requests to various data sources, collating the results of the queries, measuring response times of queries directed at the various data sources, updating edge weights of the directed graph, and so on. It is noted that although the interface manager 184 and the analysis engine 182 are illustrated as distinct subcomponents in FIG. 1, they may be implemented using the same set of software and/or hardware components in some embodiments.

When the resource resolver 180 receives a user request to identify a set of resources based on some criteria, the request may first be parsed or checked for correctness in some embodiments, e.g., either by the interface manager 184 or by the analysis engine 182. If the user request has errors, the user (e.g., client 148 or administrator 149) may be provided guidance in some embodiments to modify the request until the errors are eliminated. Then, the resource resolver 180 may obtain the directed graph representation of the resource classes, e.g., from a resource database 191. In some instances the resource resolver 180 may have to generate portions or all of the graph, e.g., based on input provided by administrators 149 about the various types of resources and resource groupings, and/or based on one or more resource discovery algorithms. When the graph is initially constructed, with the nodes representing the resource classes, and the edges representing logical relationships between the classes, an initial set of weights may be determined for the edges based on a number of factors. For example, in one embodiment the analysis engine may be responsible for executing a set of tests (e.g., issuing a set of API calls or queries to the data sources that contain records for each of the different resource classes), obtaining the response times for the various tests, and using the response times to determine the edge weights. In some cases, the number of errors encountered when running the tests may also or instead be used to set edge weights—e.g., if a particular API call addressed to a given data source has a failure rate of 0.1% or higher, a weight representing failure (such as −1) may be associated with the corresponding edge. The analysis engine 182 may also re-run the test suite periodically to update the edge weights in some embodiments; the test suite may itself be modified over time as the set of enhanced services implemented in the provider network 110 changes—e.g., more services that should be represented by new resource classes may be brought online, or some services may be terminated. The updated directed graph representation of the resource classes may be stored in resource database 191 in some embodiments. In some cases multiple versions of the directed graph may be stored, which may for example help in analysis of the resource resolver's effectiveness over time. In one embodiment where user access rights influence the results returned for various queries, multiple graphs may be stored, e.g., one for each user group with a different set of access rights. In one scenario, for example, one graph may be used for administrators 149 and another graph may be used for non-administrator users.

Using the latest version of the appropriate directed graph available, the analysis engine 182 may identify one or more query sequences that may be used to satisfy the user request. Each query sequence may consist of a plurality of queries as described above, each directed at a respective data source for a particular node of the graph. The result set of one query in a sequence may serve as an input data for the next query at least in some embodiments. The order in which two successive queries are to be issued may be based on the direction of the edge connecting the nodes representing the data sources addressed by the two queries. The analysis engine 182 may be responsible not only for generating a set of feasible query sequences in some embodiments, but also for determining the optimal or preferred query sequence based at least in part on the weights assigned to the edges of the graph. The preferred query sequence may be selected using a shortest-path graph algorithm or a lowest-cost-path graph algorithm in some cases, such as for example any appropriate variant of Dijkstra's algorithm, the A* search algorithm, the Bellman-Ford algorithm, the Floyd-Warshall algorithm, Johnson's algorithm, or some combination of such algorithms. In some embodiments the analysis engine 182 may assign relative projected performance rankings to several feasible query sequences based on edge weights, and choose the one with the highest projected performance (e.g., the lowest expected total response time) as the preferred query sequence.

Having identified the preferred query sequence based on the latest edge weight data available, the analysis engine 182 may then issue the queries of the preferred sequence. As the various queries are issued, the analysis engine 182 may collect the results and keep track of the query response times. If all the queries of the preferred sequence succeed, the result set of the final query in the sequence may comprise the response to the initial identification request received by the resource resolver 180; in addition, in some embodiments the weights of at least some of the graph edges may be updated based on the latest query performance results. If a data source to which a query of the preferred sequence is addressed does not respond within a threshold time, or fails to respond to the query entirely, the analysis engine 182 may decide to abandon the current query sequence (and update an edge weight corresponding to the failed query to a failure weight setting such as −1). If multiple query sequences were identified, the analysis engine 182 may then select an alternative query sequence (e.g., the one with the highest projected performance among the query plans not yet attempted) and issue the queries of alternative query sequence. If a query of the alternative query sequence fails, the process may be repeated—e.g., an edge corresponding to the failed query may be given a failure weight, and a different query sequence may be selected. In this way, the resources corresponding to the criteria specified in the initial request from a client 148 or administrator 149 may eventually be identified, unless of course all the feasible query sequences result in failures. The resource resolver 180 may thus be able to take advantage of graph-theory techniques to find the most efficient approach to respond to the initial request.

Example Directed Graph

Figure 2:
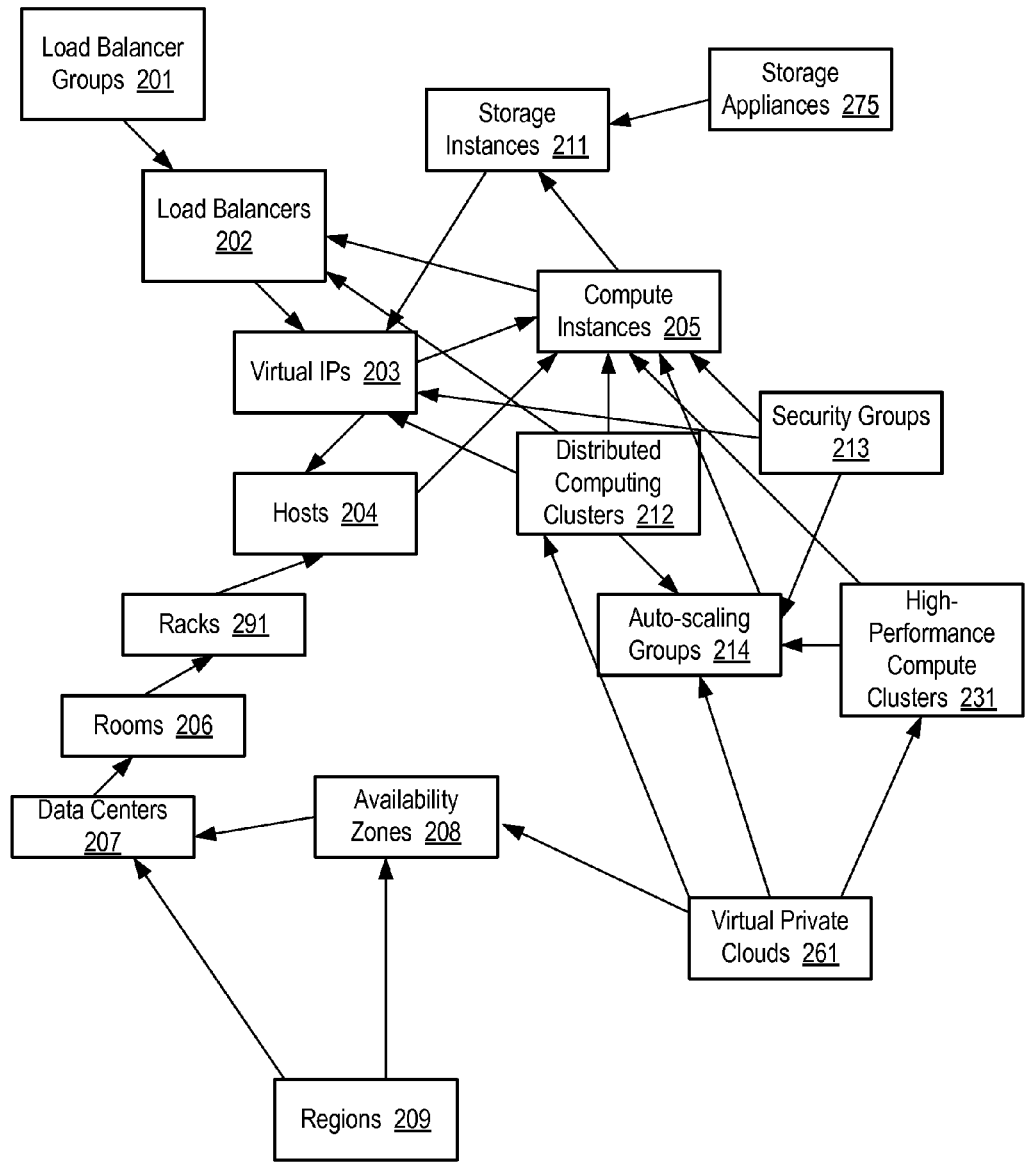
FIG. 2 illustrates an example graphical representation of the relationships between resource classes of a provider network, according to at least some embodiments.

FIG. 2 illustrates an example graphical representation of the relationships between resource classes of a provider network 110, according to at least some embodiments. Each rectangular element or node in FIG. 2 represents a data source associated with a corresponding resource class, while the directed edges represent relationships between the resource classes. To reduce clutter, edge weights are not shown. FIG. 2 is not intended be an exhaustive or complete representation of inter-class relationships, but rather to serve as a relatively simple example showing some possible resource classes and relationships. Furthermore, while in FIG. 2 only single-directional edges are shown, in some implementations the graphical representation may include bidirectional edges as well. The data sources of the illustrated provider network include sources for location-related resource classes such as regions 209, availability zones 208, data centers 207, data center rooms 206, racks 291, and hosts 204. Data sources for compute instances 205 and storage instances 211, as well as various logical aggregations of instances such as load balancer groups 201, load balancers 202, virtual IPs 203, storage appliances 275, security groups 213, distributed computing clusters 212, auto-scaling groups 214, high-performance compute clusters 231, and virtual private clouds 261 are also shown. The provider network 110 may include many more resource classes than those shown in FIG. 2 in some embodiments.

For each resource class, the corresponding data source may store various types of information. For example, for each compute instance 205, in one implementation values of some or all of the following attributes may be stored: (a) an instance identifier, (b) an identifier of a machine image installed on the compute instance, (c) a host identifier indicating the host where the instance is currently instantiated (d) an Internet Protocol (IP) address being used as a public IP address of the compute instance, i.e., an address that is accessible from devices on the public Internet that may not be part of the provider network, (e) an IP address being used as a private IP address of the compute instance, i.e., an address that is accessible only from within the provider network, (f) an identification of the type and version of hypervisor being used for the compute instance, (g) an operating system type and version for compute instance, (h) a performance rating of the compute instance (i) identification of various enhanced services being provided using the compute instance, such as for example whether the instance is being used for load balancing, distributed computing techniques such as map-reduce programs, and the like. The data sources for the various resource classes may be implemented using various techniques; for example, for some resource classes, detailed information may reside within data structures of the source code used to implement the functionality provided by the classes; for others, the detailed information may be stored in a repository such as an LDAP server; while for other classes either a commercially available or a proprietary database system may be used. The interfaces usable to obtain information from the various data sources may differ, requiring the resource resolver 180 to be able to format API calls or queries according to different programming languages and communication protocols.

Several different types of relationships may be represented using directed graphs of the type illustrated in FIG. 2. Some edges may represent containment relationship—e.g., a region 209 may contain multiple availability zones 208, and each availability zone 208 may be contained in one region 209. Other edges may represent functional or logical relationships without implying containment, e.g., a compute instance 205 may utilize data stored at a storage instance 211, without either instance containing the other. For a given resource classes, in some embodiments several data sources may be available, and one of the functions provided by the resource resolver may be to select the most appropriate data source to be used for a given query when multiple data sources are available. In some cases, data about multiple resource classes may be obtainable from the same data source—e.g., an infrastructure database for a given data center may include information about both racks 205 and hosts 204. Even though the graphical representation of the provider network may include separate nodes for racks and hosts in such a case, the queries or API calls generated for both resource classes may be directed to the same infrastructure database.

Feasible Paths Representing Query Sequences

Figure 3A:
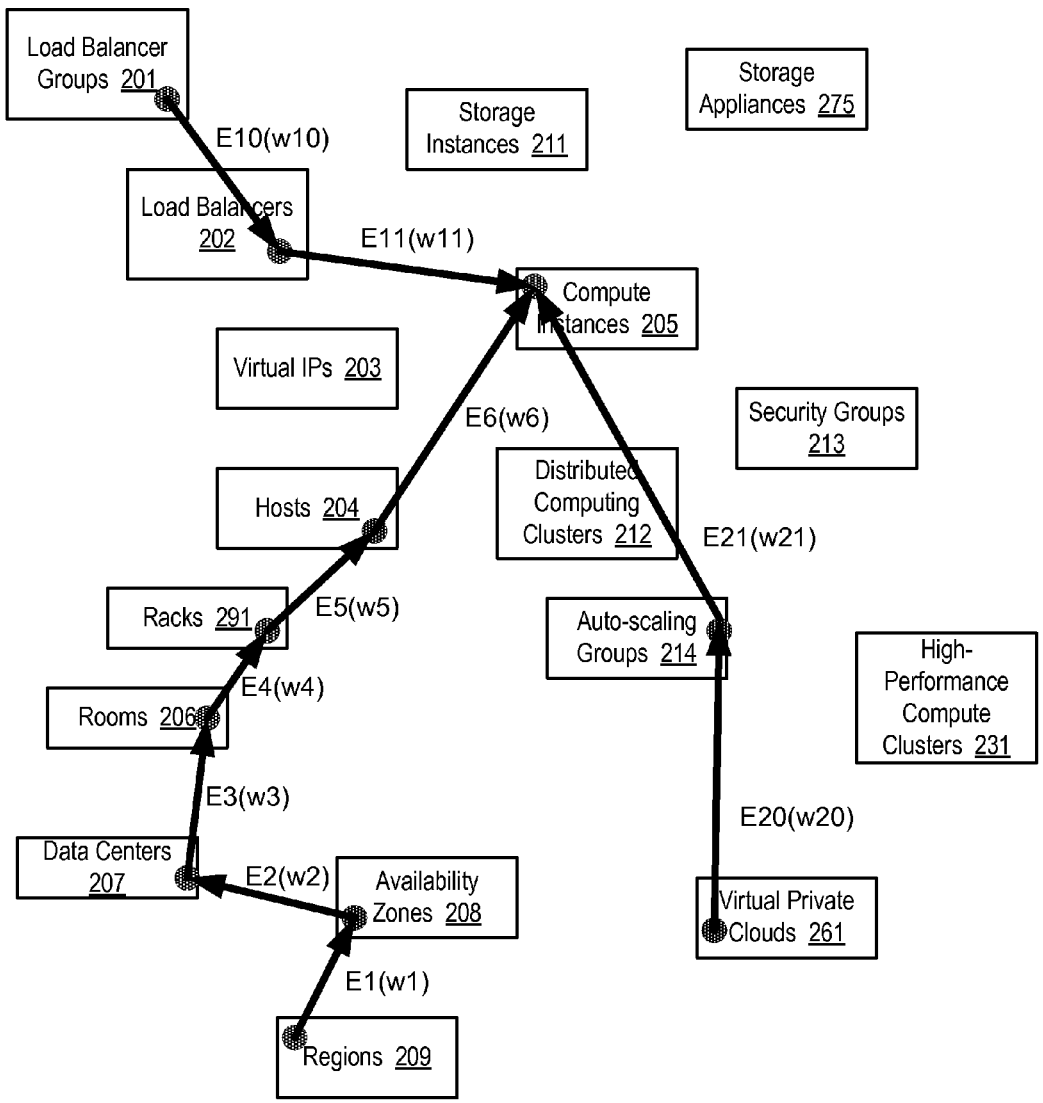
FIGS. 3a and 3b illustrate respective examples of sets of feasible paths within a directed graph representation of a provider network, where each feasible path represents a possible query sequence usable to respond to a resource identification request, according to at least some embodiments.

FIG. 3a illustrates an example of a set of alternate feasible paths within a directed graph representation of a provider network, where each feasible path represents a possible query sequence usable to respond to a resource identification request, according to at least some embodiments. In the example illustrated, the resource resolver 180 has responded to a request to identify a set of compute instances 205 (e.g., based on a set of compute instance attribute values specified in the request) by identifying three different possible paths in the graph. Each path eventually leads to the nodes representing the data source for compute instances. The first path (comprising edges E10 and E11 with respective weights w10 and w11) begins at the node for load balancer groups 201, passes through the node for load balancers 202, and ends at the node for compute instances 205. The second path (comprising edges E20 and E21 with respective weights w20 and w21) starts at virtual private cloud node 261, and passes through auto-scaling group node 214 to compute instance node 205. The third path (comprising edges E1, E2, E3, E4, E5 and E6 with respective weights w1, w2, w3, w4, w5 and w6) starts at region node 208 and passes through nodes for availability zones 208, data centers 207, rooms 206, racks 291, and hosts 204 before reaching the compute instance node 205.

Each of the three paths found by the resource resolver 180 (e.g. using its analysis engine component 182) represents a possible sequence of queries or API calls that may be issued to the data sources connected by the path. For example, in a first query sequence, the resource resolver 180 may issue an API call to the data source for load balancer groups 201 to obtain a list of load balancers 202. Then, for each load balancer 202, the resource resolver may issue a different API call to the data source for load balancers to obtain a list of the compute instances 205 associated with that load balancer 202. Then, for each compute instance found, the values of attributes of the compute instance may be compared to attribute values specified in the resource identification request, and the matching compute instances may thus be identified. Similar sequences of APIs or queries may be issued for each of the other two paths. In some embodiments, as noted above, a nearest-neighbors API or protocol may be implemented by the various data sources, and the queries addressed to at least some of the data sources may use the nearest-neighbors API or protocol. By allowing a given data source represented by a given node to ignore or reject queries that address resource classes that are neither managed at that given data source, nor at the data sources that are represented by the nodes that are nearest neighbors of the given node, the source code for the given data source may be substantially simplified in some embodiments in which such nearest-neighbor APIs are used. In some embodiments, when a request about an unsupported resource class is received, an error response or message indicating that the data source does not support queries about the specified resource class may be provided. In one embodiment, a data source implementing the nearest-neighbors API may (e.g., in response to a request or query from a user) provide a list or enumeration of the types of resource classes for which it is capable of providing query responses.

The starting nodes of the different paths (e.g., load balancer group node 201, region node 209, or virtual private group node 261) may be chosen based on a number of different factors in different embodiments. The resource resolver 180 may select a starting node based on a criterion specified in the resource identification request in some implementations—e.g., if a requesting client 148 submits a request for instances with a load balancing attribute value specified, the resource resolver 180 may decide to use load balancer group 201 as a starting node. Alternately, the starting node may be selected based on the requesting user's characteristics or properties—e.g., a client 148 may only be using certain types of enhanced functionality such as distributed computing clusters, in which case starting a query sequence at the node for distributed computing clusters may be reasonable. In some implementations the resource resolver may maintain statistics (e.g., in resource database 191) on how resource identification requests of various types have been resolved in the past, and may use its accumulated knowledge of such operations to choose starting nodes for the various paths. The ending points of each path may also be determined using similar logic, for example, based on the criteria specified in the initial request.

The projected relative (or absolute) costs of each query sequence may be estimated by the resource resolver 180 based on the current respective weights of the edges involved in the corresponding path. For example, in one simple implementation the respective costs of the three paths may be proportional to (w10+w11) for the path starting at load balancer group node 201, (w20+w21) for the path starting at virtual private cloud node 261, and (w1+w2+w3+w4+w5+w6) for the path starting at region node 209. In some embodiments more complex functions derived from the edge weights may be used to determine the relative costs of the query sequences. As noted earlier, various graph theoretic techniques such as shortest-path algorithms or least-cost-path algorithms may be used to determine the estimated costs of the various query sequences. The set of query sequences may be ranked based in relative projected performance order based on the estimated cost, and the sequence with the best overall performance (or lowest total cost) may be chosen as the current preferred sequence to try. Various types of units may be used for expressing costs and/or performance in different embodiments—e.g., response time-based units such as expected total response time, CPU-time based units such as CPU-seconds, I/O based units such as network megabytes transferred or megabytes read from disk, and so on. In some implementations the weights and/or costs may be expressed simply as numerical values without using any units.

In some embodiments the resource resolver 180 may have configurable settings that may be used to limit the total number of feasible paths to consider at any given time, so that the amount of resources (such as CPU time) needed for identifying the query sequences does not grow too large. For example, one setting value may allow a maximum of five paths to be considered at a time. In some implementations the resource resolver may be implemented as a collection of threads that can run in parallel, allowing the analysis and execution of several query sequences in parallel. In such an implementation, if N query sequences are run in parallel, as soon as one sequence completes successfully, the other N−1 sequences may be terminated.

Figure 3B:
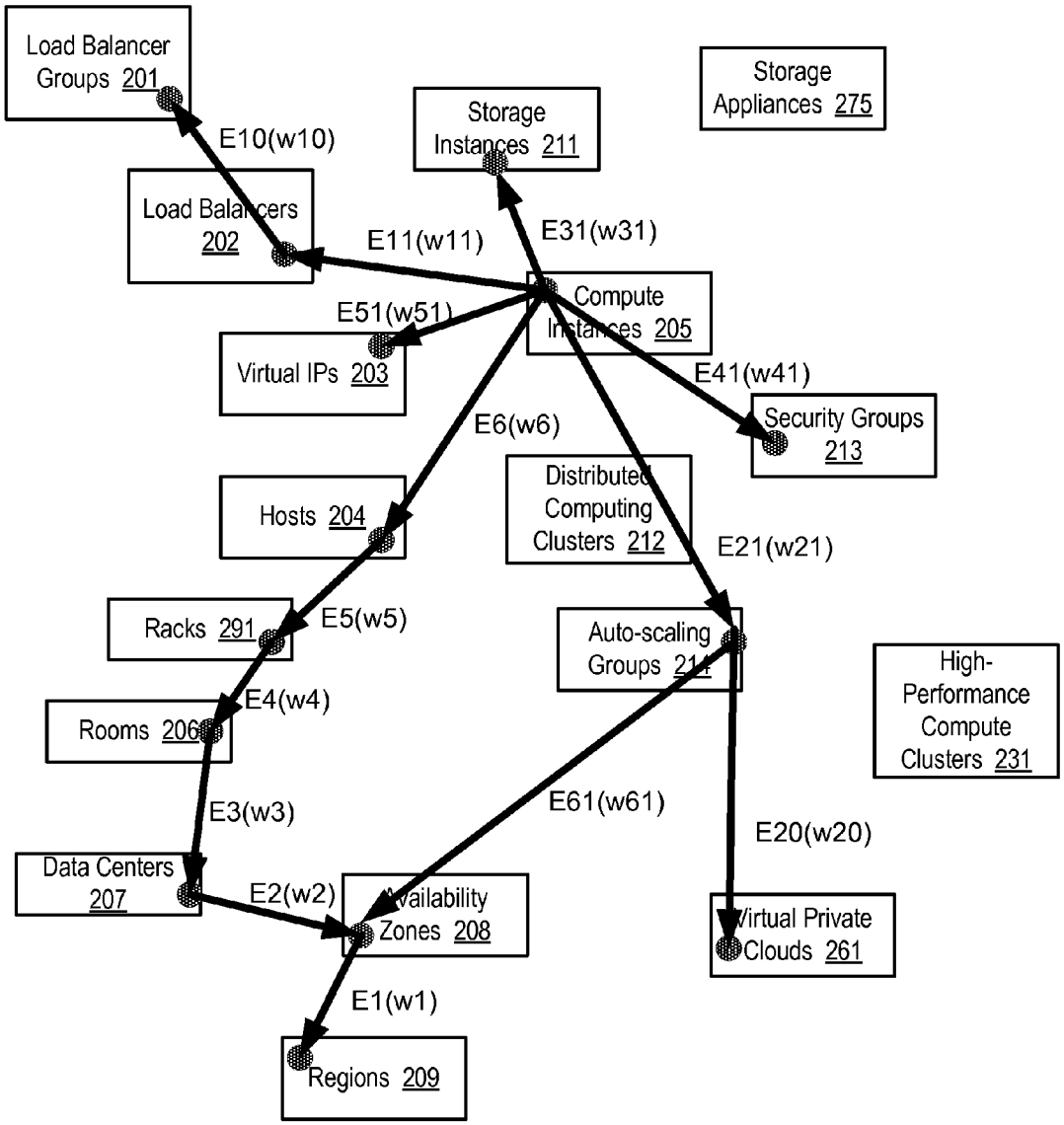

FIG. 3b illustrates another example of a set of feasible paths within a directed graph representation of a provider network, according to at least some embodiments. In the example shown in FIG. 3a, successive queries of a query sequence were generally directed to more fine-grained resource classes (e.g., a query about regions led to a query about availability zones within those regions, and the availability zone queries led to queries about data centers). The kinds of query sequences shown in FIG. 3a may be referred to as "expansion" query sequences in some embodiments, as the number of results may generally increase with each successive query of a sequence (e.g., there may in general be more compute instances than auto-scaling groups). In FIG. 3b, in contrast, the various query sequences and paths start at the node for compute instances, and successive queries of a sequence address higher-level entities—e.g., a query about a room leads to a query about the data center containing the room, and so on. The kinds of query sequences shown in FIG. 3b may be referred to as "generalization:" sequences in some embodiments.

The kinds of paths that the resource resolver 180 decides to use (i.e., going generally from higher-level resource classes to lower-level, or from lower-level to higher-level) may depend upon the information provided by the user in the specification of the resource resolution request. For example, if a client 148 provides only a compute instance ID, and wants to find out some or all of the other entities or groups to which that compute instance is related, the kind of paths shown in FIG. 3b may be used. The kinds of information returned about the specified compute instance in the example of FIG. 3b may include the Virtual IPs, security groups and storage instances with which the compute instance is associated, as well as its physical location properties, load-balancer related properties, auto-scaling groups, and virtual private clouds. As shown, there may be multiple alternate paths to a given node in the kinds of scenarios illustrated in FIG. 3b as well—for example, to find out the availability zones to which a particular compute instance belongs, alternate paths E6-E5-E4-E3-E2 and E21-E61 are available. The resource resolver may use similar edge weight-based techniques described above with respect to the "expansion"-type scenarios shown in FIG. 3a, to determine the best way to resolve a given user query in the "generalization" scenario shown in FIG. 3b. In some embodiments, the resource resolver 180 may issue queries of several alternate query sequences in parallel.

FIG. 4 illustrates an example of a type of a query sequence 401 that may be generated by the resource resolver 180, in which the output of a given query serves as input for the next query in the sequence, according to at least one embodiment. The sequence includes three queries 403A, 403B and 403C, labeled Query 1, Query 2 and Query 3, directed respectively to the data sources represented by Nodes K, L, and M of a directed graph similar to that shown in FIG. 3. Node K is connected to Node L via edge Ep with weight Wp in this example, and node L is connected to node M via edge Eq with weight Wq. The output data set of Query 1 may comprise at least a part of the input data set for Query 2, as indicated in element 406A. For example, Query2 may be executed iteratively by the resource resolver 180, once for each object in the result set of Query 1. Similarly, the output data set of Query 2 comprises at least a part of the input data set of Query 3, as shown in element 406B. The result of the final query in the sequence 407 may be returned to the user (e.g., client 148 or administrator 149) that submitted the initial request. It is noted that each query in a given query sequence may be implemented in a given embodiment using the API, programming language construct, script, protocol, or other communication technique that is appropriate for the data source being addressed, and that at least in some embodiments there may be no requirement that all queries be expressed using the same communication mechanism.

Example Resource Identification Request Expressed in SQL-Based Syntax

In some embodiments, the resource resolver 180 may (e.g., using its interface manager component 184) implement a programmatic interface allowing users such as clients 148 and/or administrators 149 to specify the criteria to be used to identify resources using a syntax based at least in part on the Structured Query Language (SQL) commonly used for accessing relational databases. Such an SQL-based or extended-SQL interface may make interactions with the resource resolver 180 easier for those users that are familiar with SQL, even though some or all of the operations (such as the query sequences discussed above) performed to respond to the user request may use APIs and/or other communication mechanisms that are very different from relational database queries. That is, a user request expressed in SQL-like syntax may not be mapped into actual SQL queries, and at least in some implementations some or all of the data sources involved in responding to the request may not support SQL and may not be implemented using relational database systems.

FIG. 5 illustrates an example of a user request 515 that may be expressed using an SQL-like syntax, according to at least one embodiment. In this example, the user wishes to obtain a list of virtualized compute instances that may have a problematic machine image installed on a block storage volume. Identifiers of one or more machine images that may be known to be problematic—e.g., images likely to cause an execution error, or likely to result in poor performance—may be known to the requesting user, and the identifiers may be used in specifying the last illustrated clause: "BLOCKSTORAGE_VOLUMES.MACHINE_IMAGE in <problematic set of images>" As shown, the request indicates that the user wishes to obtain the instance identifiers of virtual compute instances potentially affected by the problematic images, and further, that the user is suggesting that the query set used to respond to the request could include queries directed at data sources for auto scaling groups and block storage volumes.

It is noted that even though the SQL-like syntax shown in FIG. 5 appears to refer to specific tables or relations such as AUTO_SCALING_GROUP, AUTO_SCALING_GROUP_INSTANCES, BLOCKSTORAGE_VOLUMES and INSTANCE_BLOCKSTORAGE_VOLUMES, the data sources of the provider network may not actually comprise such tables or relations, and as noted above, may not even be implemented using relational or SQL-compliant database technologies. In addition, the fact that a user request suggests the use of some specific data sources (such as auto scaling group data sources in the illustrated example) may not imply that the resource resolver 180 necessarily must use those data sources. The purpose of the SQL-like syntax is to allow users to specify their requests in a familiar format; the specific steps the resource resolver takes in response may depend on the graph-based computations such as shortest path calculations that the resolver performs. In the case of the example shown in FIG. 5, the resource resolver 180 in some embodiments may find a preferred query sequence that relies on other data sources than those suggested in the request. Of course, the data sources suggested in the request may be considered for possible query sequences by the resource resolver 180, and depending on the various edge weights of the current directed graph, may indeed eventually be queried as part of a preferred query sequence in some cases.

Methods for Resource Resolution Using Directed Graphs

Figure 6:
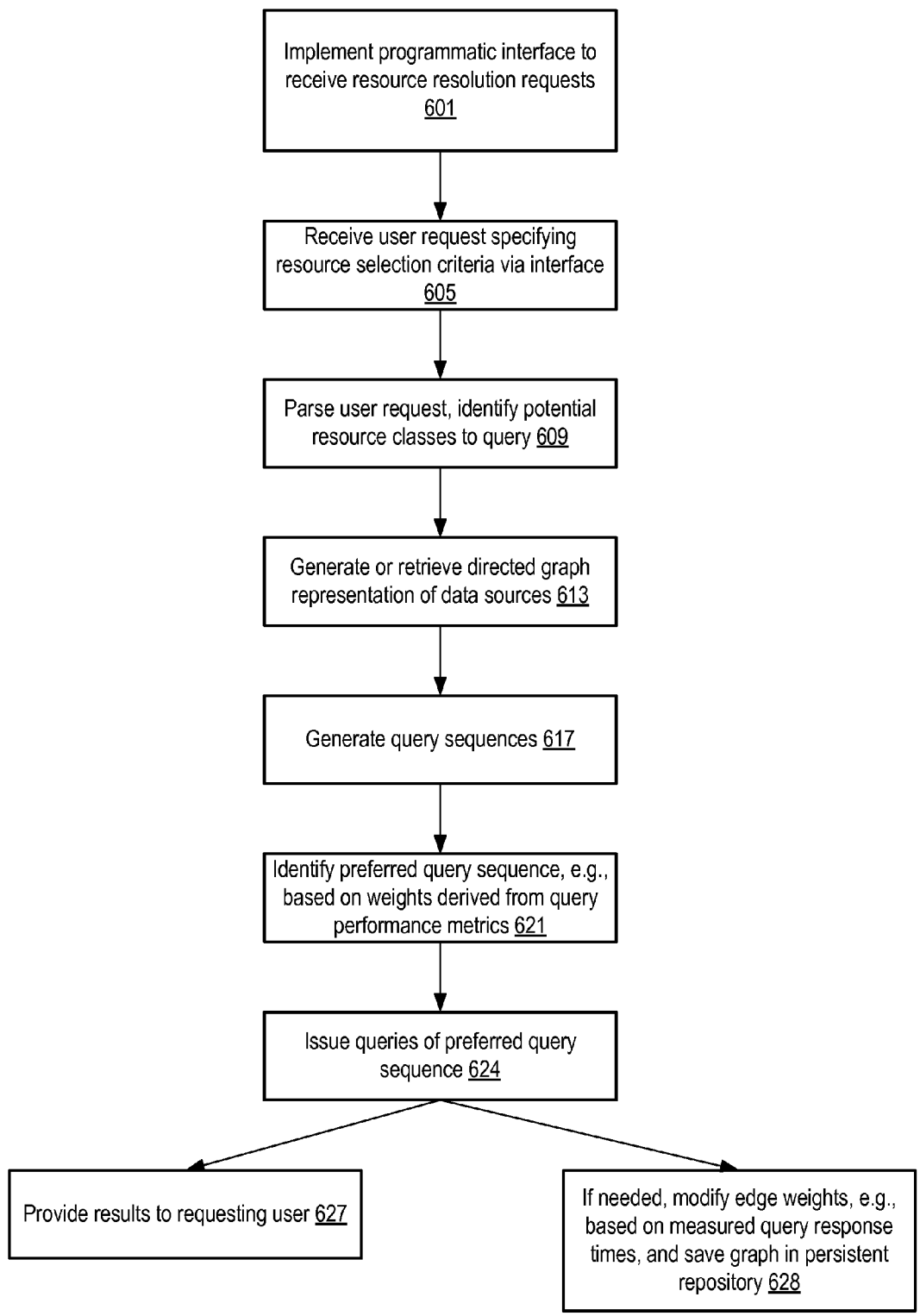
FIG. 6 is a flow diagram illustrating aspects of the functionality of a resource resolver configured to use a directed graph to respond to resource identification requests, according to at least some embodiments.

FIG. 6 illustrates aspects of the operation of a resource resolver 180, according to at least some embodiments. As shown in element 601, the resource resolver may implement a programmatic interface, such as one or more APIs, web-based interfaces, other graphical user interfaces, or command-line interfaces, to allow clients 148 and/or administrators 149 to submit resource resolution or resource identification requests. The resource resolver 180 may receive a request formatted in accordance with the interface, specifying one or more criteria to be used to find or identify the resources (element 605). The criteria may for example include attribute-value pairs for the resources.

As shown in element 609, in some embodiments the resource resolver 180 may parse the user's request, identifying potential resource classes whose data sources may be queried. The resource resolver may generate or retrieve a directed graph representation of the data sources (element 613 of FIG. 6), similar for example to the graphs shown in FIGS. 2 and 3. The graph may be retrieved from a resource database 191 in some embodiments. To generate a graph for the first time, in some embodiments input on the types of resource classes and data sources to be considered may be provided by administrators 149 of the provider network 110, e.g., in the form of an XML-based document or in some other input format. The weights of the various edges may be initially assigned by the resource resolver using query performance results and/or other metrics such as query error rates. Using a currently available version of the graph, one or more alternate query sequences may be generated by the resource resolver (element 617) based on paths identified in the directed graph. Using the edge weights of the graph, a preferred query sequence may be identified (element 621). In some implementations least-cost-path or shortest-path graph algorithms may be used to generate the alternative sequences, rank the alternatives based on projected performance, and/or identify the preferred query sequence. If only one query sequence were found, by default it may be designated as the preferred query sequence. The resource resolver 180 may then issue the queries of the preferred sequence (element 624). The results obtained may be provided to the requesting user (e.g., a client or an administrator) (element 627). In addition, in some embodiments, performance and or error-related metrics obtained during the execution of the queries may be used to update one or more edge weights of the graph (element 628), and the graph may be stored in persistent storage such as resource database 191.

Figure 7:
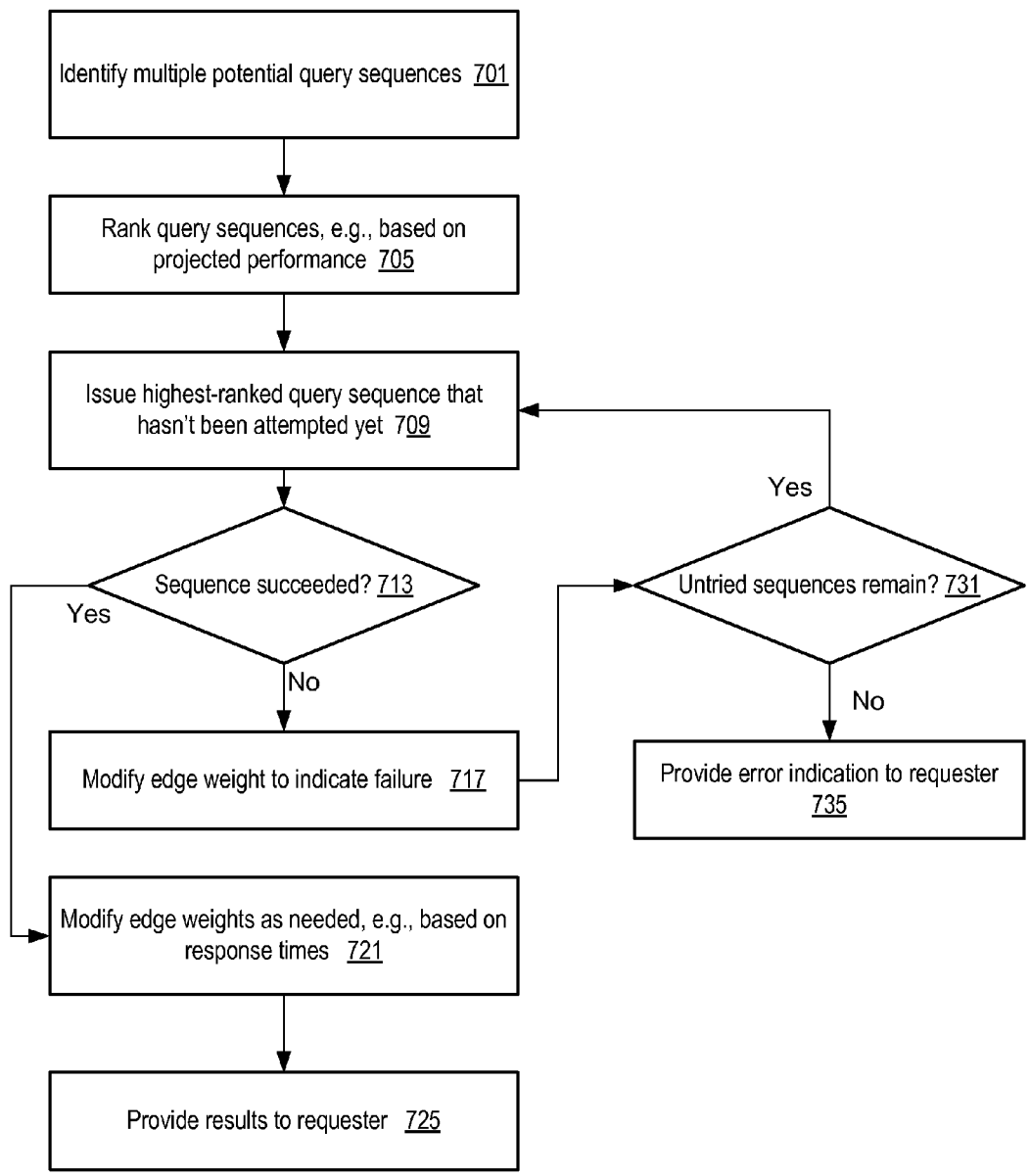
FIG. 7 illustrates aspects of the operation of a resource resolver in an embodiment where multiple query sequences are generated and a failure is encountered, according to at least some embodiments.

FIG. 7 illustrates aspects of the operation of a resource resolver 180 in an embodiment where multiple query sequences are generated and a failure is encountered, according to at least some embodiments. As shown in element 701, the resource resolver 180 may generate multiple potential query sequences to respond to a given user request. The alternative sequences may be ranked, e.g., in projected order of performance (element 705)—for example, the query sequence estimated to result in the lowest total response time may be ranked highest, the query sequence with the next-lowest total response time may be ranked second, and so on. The query sequence with the highest ranking may then be selected for execution. Queries of the highest-ranked sequence that has not yet been tried may be issued (element 709). If the sequence ends successfully, as determined in element 713, one or more edge weights of the graph may be modified based on query response time measurements obtained during the sequence execution (as indicted in element 721), and the results of the sequence may be provided to the requester (element 725).

If a query of the sequence fails, in some embodiments a special weight indicating failure may be attached to the edge corresponding to the query (as indicated in element 717). A query may be considered to have failed based on any of several criteria in different embodiments—e.g., if no response is received to the query within a particular threshold, or if the response time of the query exceeds a second threshold value, or if the response is found to contain an error. The specific weight chosen to indicate failure may be, for example, a negative number (in an embodiment where non-failure weights are expressed as positive numbers), or any other special symbol. If query sequences that have not yet been tried remain after the failure is encountered (as determined in element 731), the next-highest ranked sequence that remains may be attempted. If all the query sequences result in failures (as also determined in element 731), an error indication may be returned to the client 148 or administrator 149 that submitted the initial request (element 735). Thus, in the event of errors, the resource resolver may iterate over the available query sequences one by one until the desired response is obtained, or until all query sequences available are exhausted.

In some embodiments, after a particular edge is given a failure-indicating weight, the resource resolver 80 may periodically or based on some schedule resubmit queries to the corresponding data source. A number of different reasons may have accounted for the failure. For example, the failure may have been a result of a temporary overload of the data source, or the data source may have been deactivated briefly for maintenance or other reasons, or a network path to the data source may have experienced errors temporarily. If or when the resource resolver discovers that the resubmitted queries succeed, the edge weight may be reset to a non-failure value based on the results of the successful query.

Figure 8:
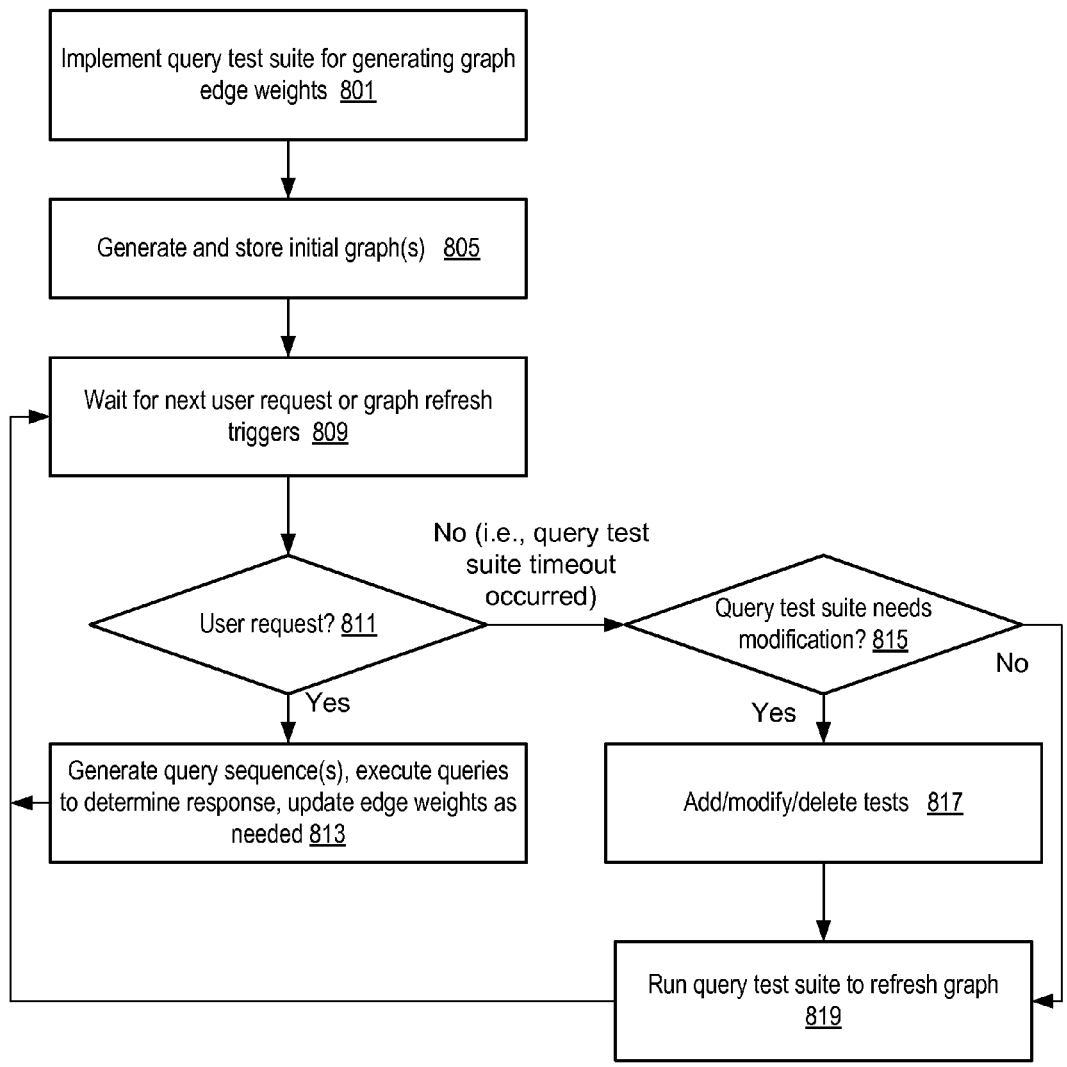
FIG. 8 is a flow diagram illustrating the use of a test suite for generating edge weights, according to at least some embodiments.

The resource resolver 180 may be configured to keep the directed graph edge weights current as conditions change in the provider network over time, e.g., as more resources or resource classes are brought online. Since the incoming user requests may be received at unpredictable times, it may be helpful for the resource resolver to execute queries internally from time to time, independently of user requests. FIG. 8 is a flow diagram illustrating the use of a test suite for generating edge weights, according to at least some embodiments. A query test suite may be implemented (element 801) (e.g., by an administrator of the provider network) to help keep the directed graph edge weights as current as possible. The suite may contain a variety of queries arranged in one or more query sequences, directed to several or all of the data sources for the resource classes of the provider network. In some embodiments the query test suite may be used to generate the weights for an initial version of the directed graph (element 805).

The resource resolver may wait for the next event that triggers a graph refresh—e.g., either a user request or an expiration of a timeout used to schedule iterations of the query test suite (element 809). If the event is a user request (as determined in element 811), the resource resolver may generate and execute the query sequences as described earlier, and update the edge weights based on the measured query response times (element 813). If the event is a timeout indicating that it is time to rerun the query test suite (as also determined in element 811), the resource resolver may in some embodiments also check whether the query test suite itself needs modification or enhancement (as determined in element 815). For example, depending on the time elapsed since the previous execution of the test suite, in some cases it may be useful to confirm whether the set of queries in the suite remains adequate. In some scenarios, for example, new resource classes may have been added to the provider network, and/or new logical relationships may have been established between resource classes. The resource manager may be configured in such embodiments to analyze input (e.g., as an XML-based file provided by an administrator) to determine whether any queries should be added to the test suite, removed from the test suite, or modified (element 817). The test suite may then be executed (element 819) and the graph may be updated based on the results. The resource resolver may then resume waiting for the next graph refresh trigger (element 809).

It is noted that some of the operations illustrated in FIGS. 6, 7 and 8 may be performed by subcomponents of the resource resolver 180—e.g., an interface manager subcomponent 184 may implement the interface and receive the user request, while an analysis engine subcomponent 182 may be responsible for determining the query sequences, issuing queries, and updating edge weights. It is also noted that some of the illustrated operations may be performed in a different order than shown in some implementations, or may be performed in parallel instead of in the illustrated sequence.

Example Web-Based Interfaces for Resource Resolution Requests

Figure 9A:
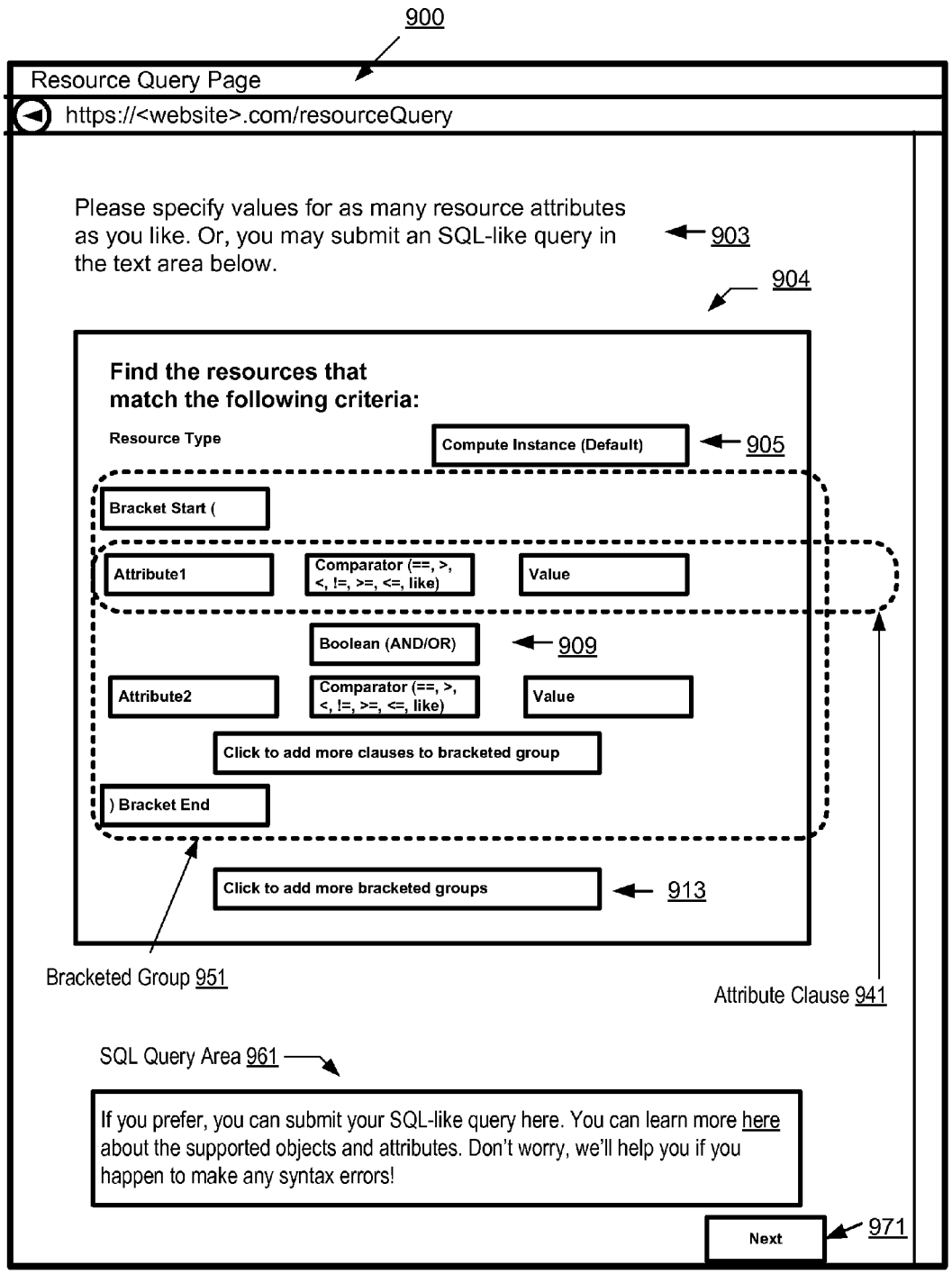
FIG. 9a illustrates a portion of an example web-based interface that may be implemented by a resource resolver to allow clients to submit resource resolution requests, according to some embodiments.

FIG. 9*a* illustrates a portion of an example web-based interface that may be implemented by the resource resolver 180 (e.g., using its interface manager component 184) to allow clients to submit resource resolution requests, according to some embodiments. As shown, the interface may comprise a web page 900 including a number of different regions and fields. Web page 900 may include a welcome message area 903 and areas 904 and 961 that allow the specification of the user request details in one of two ways: either by graphically indicating attribute value pair combinations (area 904) or using a SQL-like syntax (area 961).

Within area 904, the user may specify the resource class whose resources are to be identified (e.g., compute instances, storage instances, or any other supported resource class) using field 905. In some implementations the user may be allowed to choose the resource type using a drop-down menu for field 905 that allows only a subset of resource classes to be selected, based on the access permissions or authorization level of the user. For example, administrators 149 may be allowed to select from a larger set of resource classes than clients 148 in some environments. Similar authorization-based restrictions may apply to other fields of the web page 900 as well. For the specified resource type, the user may specify one or more bracketed groups 951 of attribute-value combinations. Each bracketed group may in turn include one or more attribute clauses 941. An attribute clause 941 may include an attribute name field, a comparator field (e.g., allowing a selection from among "equals", "greater than", "less than", "like" and so on), and a value field. Attribute clauses 941 may be combined using Boolean operators such as AND or OR using operator selector 909. Button 913 may allow more bracketed groups of Boolean combinations of attribute clauses 941 to be added to the request. The additional bracketed groups may themselves be linked via Boolean operators such as AND or OR. Using the types of web page controls supported in region 904, users may be able to specify complex combination of attribute value clauses for the resources that are to be identified.

In some embodiments, as noted above, the resource resolver may allow users to specify resource identification request details using an SQL-based syntax. Within web page 900, an SQL query text area 961 may be provided in some implementations, in which the SQL-like syntax may be entered by those users that do not wish to use the graphical attribute value approach supported in area 904. As indicated in the message shown in SQL query area 961, in some cases the resource resolver 180 may be configured to help users correct errors that may be found in the SQL-like text entered, e.g., during parsing of the text.

Figure 9B:
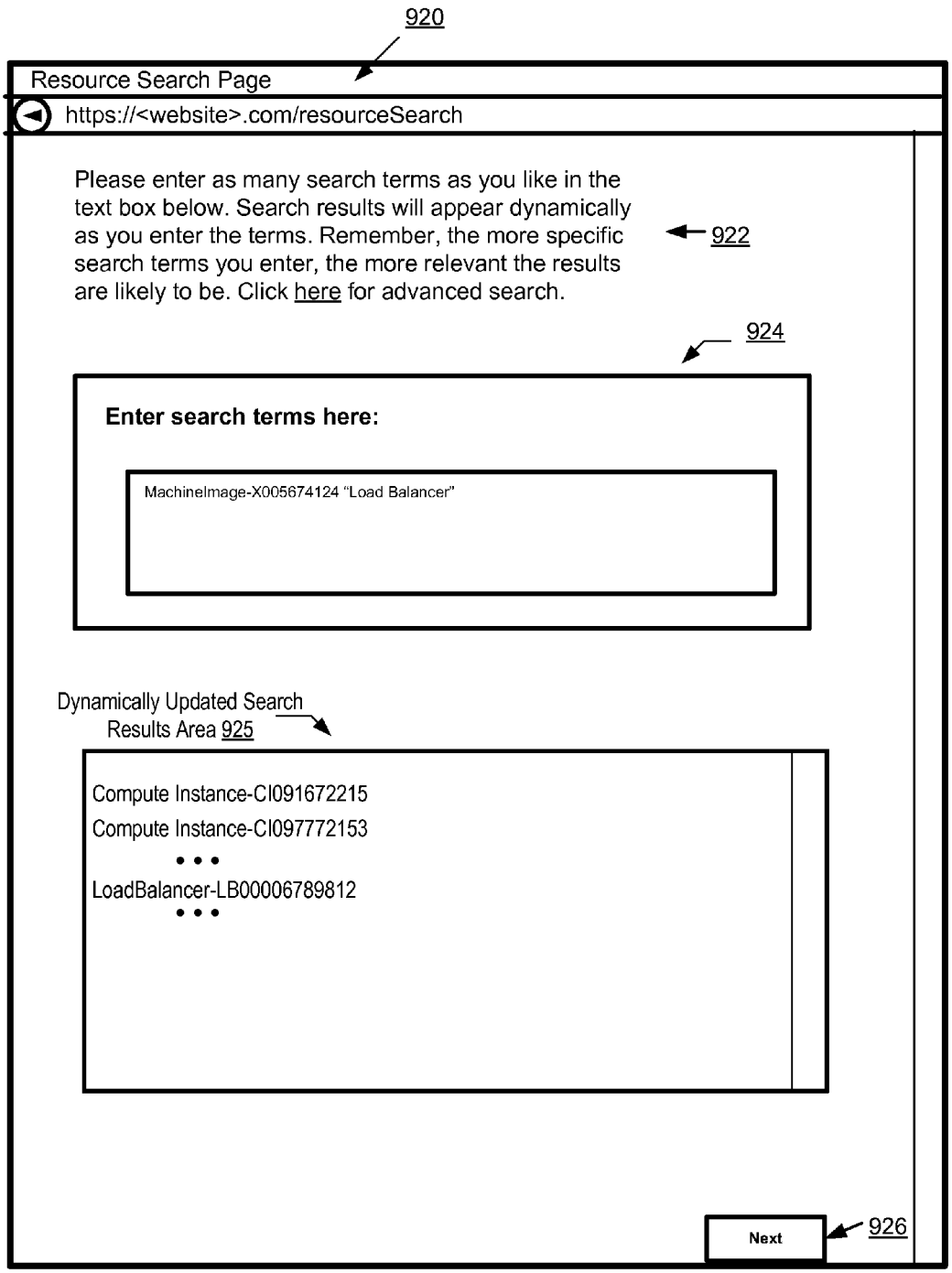
FIG. 9b illustrates a portion of an example web-based interface that may be implemented by a resource resolver to allow clients to submit resource resolution requests using a simple text search box, according to some embodiments.

In some embodiments, a simple text search interface may be provided, in addition to or instead of the more complex interfaces shown in FIG. 9*a*. FIG. 9*b* illustrates a portion of an example web-based interface that may be implemented by the resource resolver 180 (e.g., using its interface manager component 184) to allow clients to submit resource resolution requests using a simple text search box, according to some embodiments. As shown, the interface may comprise a web page 920. Web page 920 may include a welcome message area 922 that provides high-level search-related instructions to the user, and may include a link to advanced search options. In the illustrated embodiment, as soon as a user such as a client 148 or an administrator 149 enters one or more search terms into search box 924, the resource resolver 180 starts issuing queries (e.g., using the graph-based techniques described above), and providing the results in dynamically updated search results area 925 as they become available.

In the example shown, the user has entered two terms thus far: an identifier of a specific machine image deployed at some of the compute instances of the provider network, and the term "Load Balancer". As soon as the machine image term is entered, the resource resolver 180 may begin generating one or more alternative query sequences related to machine images, and issuing the queries of the preferred query sequences. The machine image queries may result in a list of compute instances that have deployed that specific machine image, as shown near the top of the results area 925. When the user enters the second term "Load Balancer", the set of queries issued may change based on the combination of the machine image identifier and the "Load Balancer" term, and the results shown may change—e.g., one or more compute instances that do not happen to be participating in load balance-related operations may be removed from the results, and one or more load balancer entities may be added to the results. As more and more search terms are added, the resource resolver may gradually narrow down the set of results based on searches for logical "AND" combinations of the search terms in some embodiments. The user may stop entering search terms at any point if the results shown are acceptable. In some embodiments the resource resolver 180 may wait a few seconds before issuing new queries, to allow a more specific set of search terms to be provided, so that the resolver does not get overwhelmed by constantly changing search paths. Advanced search options may allow additional Boolean combinations of search terms and/or other features in some implementations. A simple text-based search as shown in FIG. 9b may allow clients that do not have (or do not wish to divulge) detailed information about various entities and attributes to take advantage of the capabilities of the resource resolver.

Example Use Cases

The techniques described above for supporting directed-graph based resource resolution may be useful in a variety of environments. As the size and complexity of cloud-based resource provisioning grows, and more and more different types of enhanced services are deployed into cloud environments, the difficulty of identifying the most efficient way to identify assets is likely to increase as well. Especially in large provider network environments in which the various services are implemented by software development teams at different times with potentially different implementation techniques or design methodologies, or where some of the technologies have been purchased from acquired companies, data redundancy may be fairly common. As a result, more than one way of resolving any given resource request may frequently be possible. Furthermore, at any given point in time, one or more data sources may be overloaded or down in very large networks, so that the ability to efficiently find alternative approaches to resource resolution requests may become more and more valuable.

By using dynamic graph-theoretic approaches such as those described herein, the complexity of, and effort required for, handling resource queries may be substantially reduced. In addition, the code required to support resource identification requests at various data sources may also be simplified, especially if nearest-neighbors protocols or APIs are used. For both external clients and administrators of the provider network, the implementation of easy to use interfaces for specifying resource requests, e.g., using familiar SQL-like syntax, may also be a great help and may result in quicker resolution of operational problems and support issues.

Illustrative Computing Device

Figure 10:
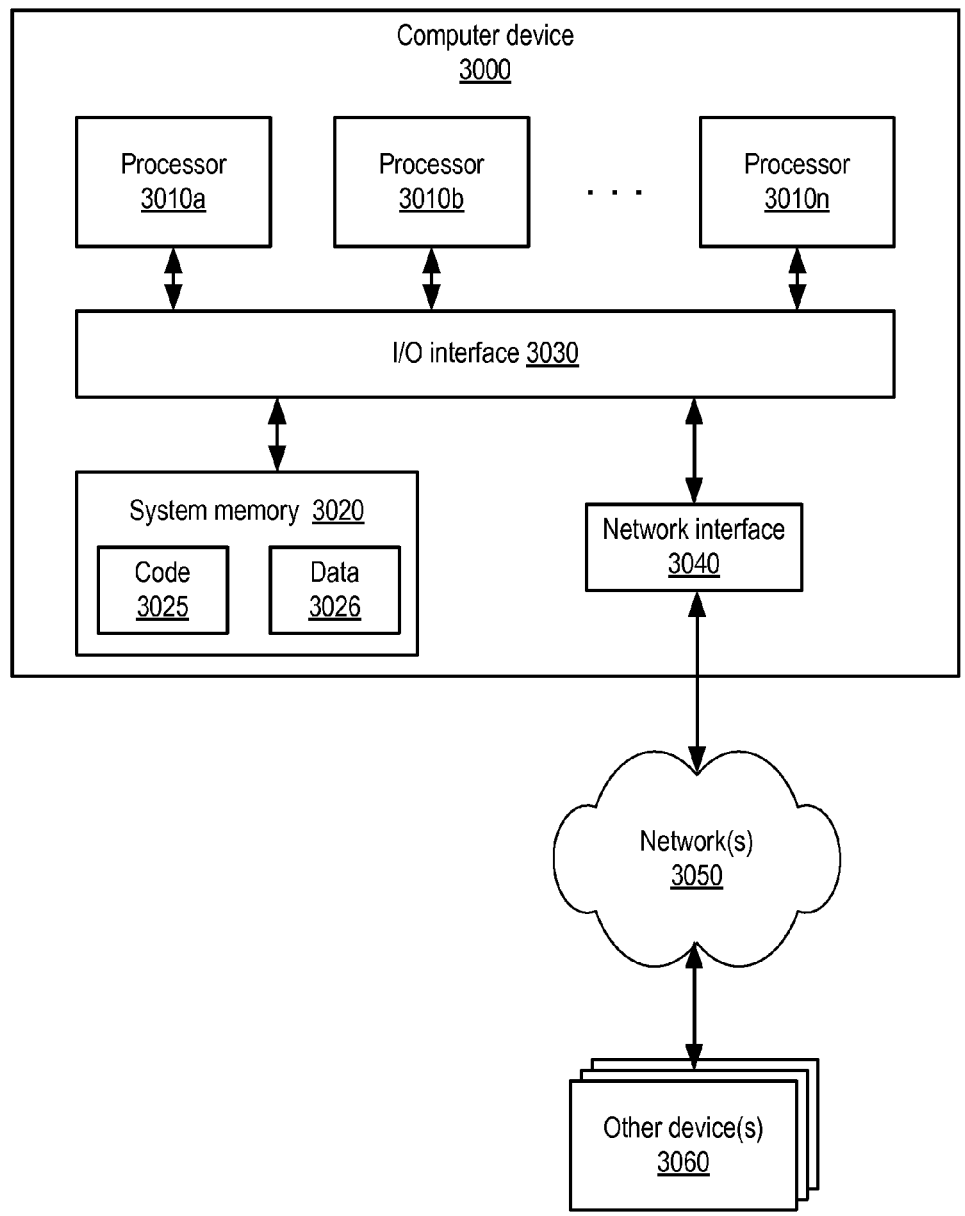
FIG. 10 is a block diagram illustrating an example computing device that may be used in some embodiments.

In at least some embodiments, a server that implements a portion or all of one or more of the technologies described herein, including the techniques to implement the functionality of resource resolver 180, may include a computing device such as a general-purpose computer system that includes or is configured to access one or more computer-accessible media. FIG. 10 illustrates such a general purpose computing device 3000. Various subcomponents of the resource resolver 180, such as the analysis engine 182 and the interface manager 184, may also be implemented using a general purpose computing device similar to that shown in FIG. 10. In some implementations a combination of the subcomponents may be implemented using a single host or server, while in other implementations each subcomponent may be implemented on a different general-purpose computer system. In the illustrated embodiment, computing device 3000 includes one or more processors 3010 coupled to a system memory 3020 via an input/output (I/O) interface 3030. Computing device 3000 further includes a network interface 3040 coupled to I/O interface 3030.

In various embodiments, computing device 3000 may be a uniprocessor system including one processor 3010, or a multiprocessor system including several processors 3010 (e.g., two, four, eight, or another suitable number). Processors 3010 may be any suitable processors capable of executing instructions. For example, in various embodiments, processors 3010 may be general-purpose or embedded processors implementing any of a variety of instruction set architectures (ISAs), such as the x86, PowerPC, SPARC, or MIPS ISAs, or any other suitable ISA. In multiprocessor systems, each of processors 3010 may commonly, but not necessarily, implement the same ISA.

System memory 3020 may be configured to store instructions and data accessible by processor(s) 3010. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code 3025 and data 3026.

In one embodiment, I/O interface 3030 may be configured to coordinate I/O traffic between processor 3010, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processor 3010). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processor 3010.

Network interface 3040 may be configured to allow data to be exchanged between computing devices 3000 and other devices 3060 attached to a network or networks 3050, such as other computer systems (including systems used by clients 148 or administrators 149) or devices as illustrated in FIGS. 1 through 9, for example. In various embodiments, network interface 3040 may support communication via any suitable wired or wireless general data networks, such as types of Ethernet network, for example. Additionally, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-accessible medium configured to store program instructions and data as described above for FIGS. 1 through 9 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 3000 via I/O interface 3030. A non-transitory computer-accessible storage medium may also include any volatile or non-volatile media such as RAM (e.g. SDRAM, DDR SDRAM, RDRAM, SRAM, etc.), ROM, etc, that may be included in some embodiments of computer system 3000 as system memory 3020 or another type of memory. Further, a computer-accessible medium may include transmission media or signals such as electrical, electromagnetic, or digital signals, conveyed via a communication medium such as a network and/or a wireless link, such as may be implemented via network interface 3040. Portions or all of multiple computer systems such as that illustrated in FIG. 13 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

Conclusion

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc, as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising a plurality of computing devices configured to implement:
    a plurality of resources of a provider network;
    a plurality of data sources, wherein each data source of the plurality of data sources comprises records on a respective resource class of a plurality of resource classes, wherein each resource of the plurality of resources belongs to one or more resource classes of the plurality of resource classes; and
    a resource resolver;
    wherein the resource resolver is operable to:
        receive a request to identify a set of resources of the plurality of resources based on one or more criteria specified in the request;
        utilize a directed graph representation of at least a subset of the plurality of data sources to identify one or more query sequences to respond to the request, wherein the directed graph comprises a plurality of nodes and a plurality of edges, and wherein:
            each node of the directed graph represents a data source of the plurality of data sources, and each edge of the directed graph represents a logical relationship between the data sources whose nodes are connected by the edge;
            each edge of a set of edges of the directed graph has an associated weight based at least in part on a performance metric obtained from one of the two data sources whose nodes are connected by the edge; and
            each query sequence of the one or more query sequences comprises a plurality of queries, wherein each query of the plurality of queries is to be directed to a respective data source of the plurality of data sources; and
        issue one or more queries of a preferred query sequence identified from the one or more query sequences, wherein the one or more queries are issued to respective data sources of the plurality of data sources.

2. The system as recited in claim 1, wherein a particular query sequence of the one or more query sequences comprises a first query followed by a second query, wherein at least a portion of a output data set of the first query forms at least a portion of an input data set for the second query.

3. The system as recited in claim 1, wherein the one or more query sequences comprise a plurality of query sequences, wherein the resource resolver is operable to:
    assign a projected performance ranking to each query sequence of the plurality of query sequences based at least in part on one or more weights associated with edges of nodes representing the data sources to be queried in the query sequence, wherein the preferred query sequence has the highest ranking of the plurality of query sequences, and
    in response to determining that a query of the preferred query sequence has failed, issue one or more queries of an alternate query sequence of the plurality of query sequences, wherein the alternate query sequence has a lower ranking than the preferred query sequence.

4. The system as recited in claim 1, wherein the performance metric comprises a query response time metric, and wherein the resource resolver is further operable to:
    modify the weight of an edge of the directed graph based on a measurement of a response time of a query executed in response to the request.

5. The system as recited in claim 1, wherein the resource resolver is further operable to:
    implement an interface allowing a specification of the one or more criteria of the request in a syntax based at least in part on the Structured Query Language (SQL).

6. The system as recited in claim 1, wherein a particular data source of the plurality of data sources implements a nearest-neighbors application programming interface (API), wherein, in accordance with the nearest-neighbors API, the particular data source is configured to:
    respond to queries on a subset of resource classes of the plurality of resource classes comprising (a) the resource class whose records are maintained in the particular data source and (b) the resource classes of those data sources whose nodes are nearest neighbors of the node representing the particular data source in the directed graph; and
    ignore or reject queries on resource classes that do not belong to the subset of resource classes; and
    wherein at least one query of the preferred query sequence is formatted in accordance with the nearest-neighbors API.

7. A method, comprising:
    maintaining resource records at a plurality of data sources, wherein each data source of the plurality of data sources comprises records on a respective resource class of a plurality of resource classes, wherein each resource of a plurality of resources of a provider network belongs to one or more resource classes of the plurality of resource classes;

receiving a request to identify a set of resources of the plurality of resources based on one or more criteria specified in the request;

utilizing a directed graph representation of at least a subset of the plurality of data sources to identify one or more query sequences to respond to the request, wherein:

each node of the directed graph represents a data source of the plurality of data sources, and each edge of the directed graph represents a logical relationship between the data sources whose nodes are connected by the edge;

each edge of at least a subset of the edges of the directed graph has an associated weight based at least in part on a performance metric obtained from one of the two data sources whose nodes are connected by the edge; and each query sequence of the one or more query sequences comprises a plurality of queries, wherein each query of the plurality of queries is to be directed to a respective data source of the plurality of data sources.

8. The method as recited in claim 7, further comprising: issuing one or more queries of a preferred query sequence of the one or more query sequences to at least one data source of the plurality of data sources.

9. The method as recited in claim 8, wherein the one or more query sequences comprise a plurality of query sequences, further comprising:

assigning a projected performance ranking to each query sequence of the plurality of query sequences based at least in part on one or more weights associated with edges of nodes representing the data sources to be queried in the query sequence; and identifying the query sequence with the highest ranking among the plurality of query sequences as the preferred query sequence.

10. The method as recited in claim 9, further comprising: in response to determining that a query of the preferred query sequence has failed, issuing one or more queries of an alternate query sequence of the plurality of query sequences, wherein the alternate query sequence has a lower ranking than the preferred query sequence.

11. The method as recited in claim 7, further comprising: in response to determining that a particular query of the preferred query sequence has failed, assigning a failure-indicating weight to an edge of the directed graph, wherein the edge is connected to a node representing a data source to which the particular query was directed.

12. The method as recited in claim 7, further comprising: storing the directed graph representation in a persistent store; and retrieving the directed graph representation from the persistent store to respond to an additional request.

13. The method as recited in claim 7, wherein a direction of an edge of the directed graph indicates a containment relationship between the resource classes corresponding to the data sources represented by the nodes connected via the edge.

14. The method as recited in claim 7, further comprising: modifying the weight of an edge of the directed graph based at least in part on a measurement of a response time of a query executed in response to the request.

15. The method as recited in claim 7, further comprising: executing a set of queries of a graph update test suite scheduled in accordance with a graph refresh policy; and updating the weights of one or more edges of the directed graph based at least in part on one or more results of the graph update test suite.

16. The method as recited in claim 7, further comprising: implementing an interface allowing a specification of the one or more criteria of the request in a syntax based at least in part on the Structured Query Language (SQL).

17. The method as recited in claim 7, wherein a particular data source of the plurality of data sources implements a nearest-neighbors application programming interface (API), wherein, in accordance with the nearest-neighbors API, the particular data source is configured to:

respond to queries directed to a subset of resource classes comprising (a) the resource class whose records are maintained at the particular data source and (b) the resource classes of those data sources whose nodes are nearest neighbors of the node representing the particular data source in the directed graph; and reject queries directed to resource classes that do not belong to the subset of resource classes;

and wherein at least one query of the preferred query sequence is formatted in accordance with the nearest-neighbors API.

18. A non-transitory computer-accessible storage medium storing program instructions that when executed on one or more processors:

receive a request to identify a set of resources of a plurality of resources of a provider network based on one or more criteria specified in the request; and utilize a directed graph representation of at least a subset of a plurality of data sources to identify one or more query sequences to respond to the request, wherein each data source of the plurality of data sources comprises records on a respective resource class of a plurality of resource classes, wherein each resource of the plurality of resources of the provider network belongs to one or more resource classes of the plurality of resource classes, and wherein:

each node of the directed graph represents a data source of the plurality of data sources, and each edge of the directed graph represents a logical relationship between the data sources whose nodes are connected by the edge;

each edge of at least a subset of the edges of the directed graph has an associated weight based at least in part on a performance metric obtained from one of the two data sources whose nodes are connected by the edge; and each query sequence of the one or more query sequences comprises a plurality of queries, wherein each query of the plurality of queries is to be directed to a respective data source of the plurality of data sources.

19. The storage medium as recited in claim 18, wherein the instructions when executed on the one or more processors:

issue one or more queries of a preferred query sequence of the one or more query sequences to at least one data source of the plurality of data sources.

20. The storage medium as recited in claim 19, wherein the one or more query sequences comprise a plurality of query sequences, wherein the instructions when executed on the one or more processors:

assign a projected performance ranking to each query sequence of the plurality of query sequences based at least in part on one or more weights associated with edges of nodes representing the data sources to be queried in the query sequence; and identify the query sequence with the highest ranking among the plurality of query sequences as the preferred query sequence.

21. The storage medium as recited in claim 20, wherein the instructions when executed on the one or more processors:
in response to determining that a query of the preferred query sequence has failed, issue one or more queries of an alternate query sequence of the plurality of query sequences, wherein the alternate query sequence has a lower ranking than the preferred query sequence.

22. The storage medium as recited in claim 18, wherein the instructions when executed on the one or more processors:
modify the weight of an edge of the directed graph based at least in part on a measurement of an error rate of a set of queries issued to a particular data source of the plurality of data sources, wherein the edge is connected to a node representing the particular data source.

23. The storage medium as recited in claim 18, wherein the instructions when executed on the one or more processors:
implement an interface allowing a specification of the one or more criteria of the request in a syntax based at least in part on the Structured Query Language (SQL).

24. The storage medium as recited in claim 18, wherein at least one query of a particular query sequence of the one or more query sequences is formatted in accordance with a nearest-neighbors API implemented by a particular data source of the plurality of data sources, wherein, in accordance with the nearest-neighbors API, the particular data source is configured to:
respond to queries directed to a subset of resource classes comprising (a) the resource class whose records are maintained at the particular data source and (b) the resource classes of those data sources whose nodes are nearest neighbors of the node representing the particular data source in the directed graph; and
reject queries directed to resource classes that do not belong to the subset of resource classes.

25. The storage medium as recited in claim 24, wherein in accordance with the nearest-neighbors API, the particular data source is configured to:
in response to a request to indicate resource classes for which the particular data source is configured to respond to queries, provide an enumeration of the resource classes of the subset of resource classes.

26. The storage medium as recited in claim 18, wherein the plurality of resource classes comprises at least one of: a compute instance class, a storage instance class, an availability zone class, a provider network region class, an auto-scaling group class, a load balancer class, a distributed computing cluster class, a virtual private cloud class, or a security group class.

27. The storage medium as recited in claim 18, wherein a resource record for a compute instance class of the plurality of resource classes comprises at least one of: (a) an identifier of a machine image installed on a compute instance, (b) a host identifier for a compute instance, (c) an Internet Protocol (IP) address being used as a public IP address of a compute instance, (d) an IP address being used as a private IP address of a compute instance, (e) a hypervisor identifier of a compute instance, (f) an operating system identifier of a compute instance, or (g) a performance rating of a compute instance.

28. The storage medium as recited in claim 18, wherein the instructions when executed on the one or more processors:
determine a lowest-cost path between two nodes of the directed graph to identify a particular query sequence of the one or more query sequences, wherein the lowest-cost path is determined based at least in part on respective weights of one or more edges connected the two nodes.

* * * * *